(12) United States Patent  
Kishimoto

(10) Patent No.: US 8,527,643 B2
(45) Date of Patent: Sep. 3, 2013

(54) DATA PROCESSING APPARATUS THAT REGISTERS INFORMATION NOTIFICATION DESTINATION AND METHOD THEREFOR, AND STORAGE MEDIUM

(75) Inventor: Norihisa Kishimoto, Kawasaki (JP)

(73) Assignee: Canon Kabushiki Kaisha (JP)

(*) Notice: Subject to any disclaimer, the term of this patent is extended or adjusted under 35 U.S.C. 154(b) by 393 days.

(21) Appl. No.: 12/822,622

(22) Filed: Jun. 24, 2010

(65) Prior Publication Data

US 2010/0333180 A1 Dec. 30, 2010

(30) Foreign Application Priority Data

Jun. 24, 2009 (JP) ................... 2009-149796

(51) Int. Cl.
*G06F 15/16* (2006.01)
(52) U.S. Cl.
USPC .......... 709/228; 709/222; 709/223; 709/245; 715/736
(58) Field of Classification Search
USPC .............. 709/222, 223, 227, 245; 715/736
See application file for complete search history.

(56) References Cited

U.S. PATENT DOCUMENTS

| | | | | |
|---|---|---|---|---|
| 6,954,720 | B2 * | 10/2005 | Oya | 702/188 |
| 7,676,512 | B2 * | 3/2010 | Yamamoto et al. | 707/608 |
| 2006/0221372 | A1 * | 10/2006 | Onishi et al. | 358/1.13 |
| 2010/0333180 | A1 * | 12/2010 | Kishimoto | 726/4 |

FOREIGN PATENT DOCUMENTS

| | | |
|---|---|---|
| JP | 10-041973 A | 2/1998 |
| JP | 2002-342279 A | 11/2002 |
| JP | 2004192279 A | 7/2004 |
| JP | 2006-350644 A | 12/2006 |
| JP | 2007-293805 A | 11/2007 |

OTHER PUBLICATIONS

Office Action Issued in Corresponding Japanese Patent Application 2009-149796 dated Apr. 9, 2013.

* cited by examiner

Primary Examiner — Michael Won
(74) Attorney, Agent, or Firm — Rossi, Kimms & McDowell LLP

(57) ABSTRACT

A capable of preventing reception and processing of large data acquired based on a query string, thereby making it possible to prevent data reception and processing from affecting another event notification or registration request processing performed by the data processing apparatus. When a query string determination section determines that destination information for identifying a notification destination contains a specific character string, an event notification destination registration-determining section determines that the notification destination of information concerning the data processing apparatus is not to be registered in an event notification information-storing section. A Web service response-returning section returns a response indicating that the notification destination has not been registered, to an information processing apparatus connected to the data processing apparatus.

26 Claims, 17 Drawing Sheets

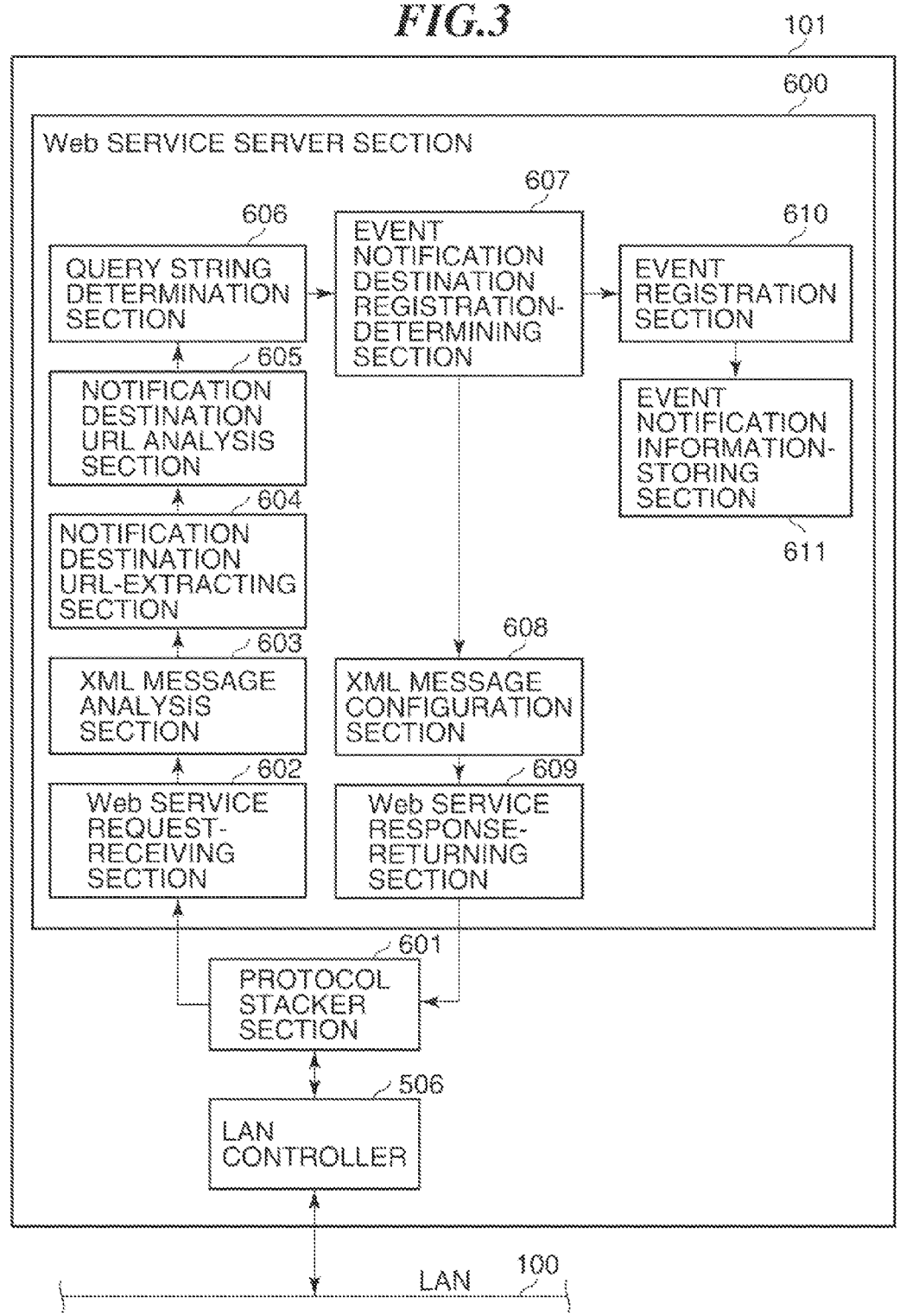

FIG.4A

```
POST /event HTTP/1.1
Content-Length: 718

<?xml version="1.0" encoding="utf-8" ?>
<soap:Envelope
xmlns:wsa="addressing"
xmlns:wse="eventing">
<soap:Header>
    <wsa:Action>Subscribe</wsa:Action>   ~201
</soap:Header>
<soap:Body>
    <wse:Subscribe>                                     202
        <wse:EndTo>
            <wsa:Address>http://192.168.242.103/EventEnd</wsa:Address>
        </wse:EndTo>
        <wse:NotifyTo>
            <wsa:Address>http://192.168.242.103/Event</wsa:Address>
        </wse:NotifyTo>
        <wse:Filter>JobEndEvent</wse:Filter>   ~203
    </wse:Subscribe>                  ~204
</soap:Body>
</soap:Envelope>
```

FIG.4B

```
                 205
HTTP/1.1 200 OK ~
Content-Length: 502

<?xml version="1.0" encoding="utf-8" ?>
<soap:Envelope
xmlns:wsa="addressing"
xmlns:wse="eventing">
<soap:Header>                                    206
    <wsa:Action>SubscribeResponse</wsa:Action> ~
</soap:Header>
<soap:Body>
    <wse:SubscribeResponse />
</soap:Body>
</soap:Envelope>
```

FIG.5A

```
POST /event HTTP/1.1
Content-Length: 718

<?xml version="1.0" encoding="utf-8" ?>
<soap:Envelope
xmlns:wsa="addressing">
<soap:Header>
    <wsa:Action>JobEndEvent</wsa:Action>  ~207
</soap:Header>
<soap:Body />
</soap:Envelope>
```

FIG.5B

```
HTTP/1.1 200 OK
Content-Length: 0
```

FIG.6A

```
POST /mail.cgi?usr=111&pw=222&id=333 HTTP/1.1    ─301
Content-Length: 100

<html><header>...
```

FIG.6B

```
HTTP/1.1 200 OK
Content-Length: 100

<html><header>...</header>
<body>mail number:333   user name:111<br>
Hello... </body></html>    ─302
```

FIG.7A

```
POST /event HTTP/1.1
Content-Length: 718

<?xml version="1.0" encoding="utf-8" ?>
<soap:Envelope
xmlns:wsa="addressing"
xmlns:wse="eventing">
<soap:Header>
    <wsa:Action>Subscribe</wsa:Action>    ~201
</soap:Header>
<soap:Body>
    <wse:Subscribe>                                        401
        <wse:EndTo>
            <wsa:Address>http://192.168.242.103/mail.cgi?usr=111&pw=
222&id=333</wsa:Address>
        </wse:EndTo>
        <wse:NotifyTo>
            <wsa:Address>http://192.168.242.103/mail.cgi?usr=111&pw=
222&id=333</wsa:Address>
        </wse:NotifyTo>                                    402
        <wse:Filter>JobEndEvent</wse:Filter>
    </wse:Subscribe>
</soap:Body>
</soap:Envelope>
```

FIG.7B

```
                                                    403
POST /mail.cgi?usr=111&pw=222&id=333 HTTP/1.1
Content-Length: 718

<?xml version="1.0" encoding="utf-8" ?>
<soap:Envelope
xmlns:wsa="addressing">
<soap:Header>
    <wsa:Action>JobEndEvent</wsa:Action>
</soap:Header>
<soap:Body />
</soap:Envelope>
```

*FIG.8*

```
HTTP/1.1 200 OK
Content-Length: 502

<?xml version="1.0" encoding="utf-8" ?>
<soap:Envelope>
<soap:Header />
<soap:Body>
    <soap:Fault>                                  404
        <soap:FaultString>Regist Error</soap:FaultString>
    </soap:Fault>
</soap:Body>
</soap:Envelope>
```

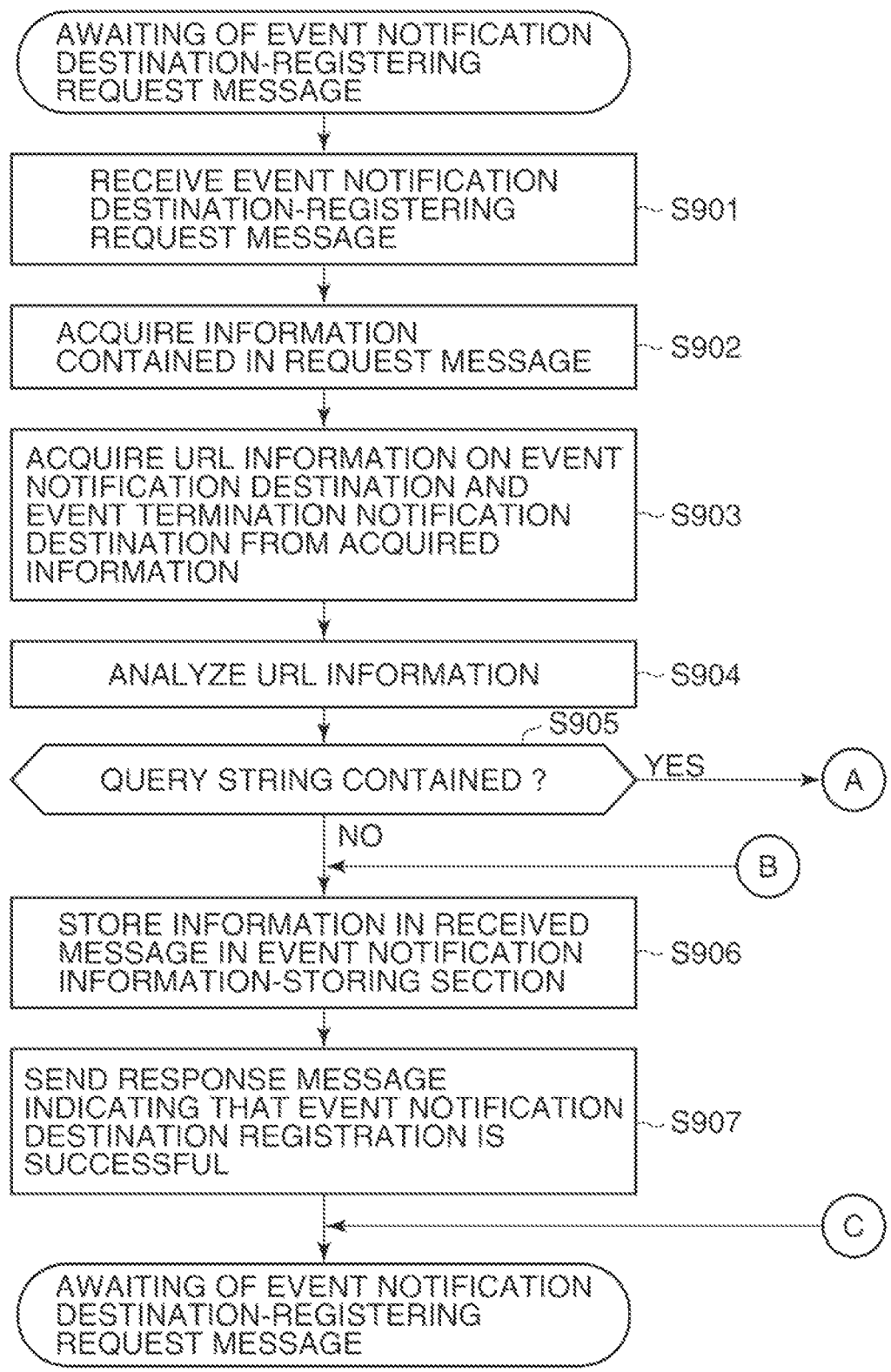

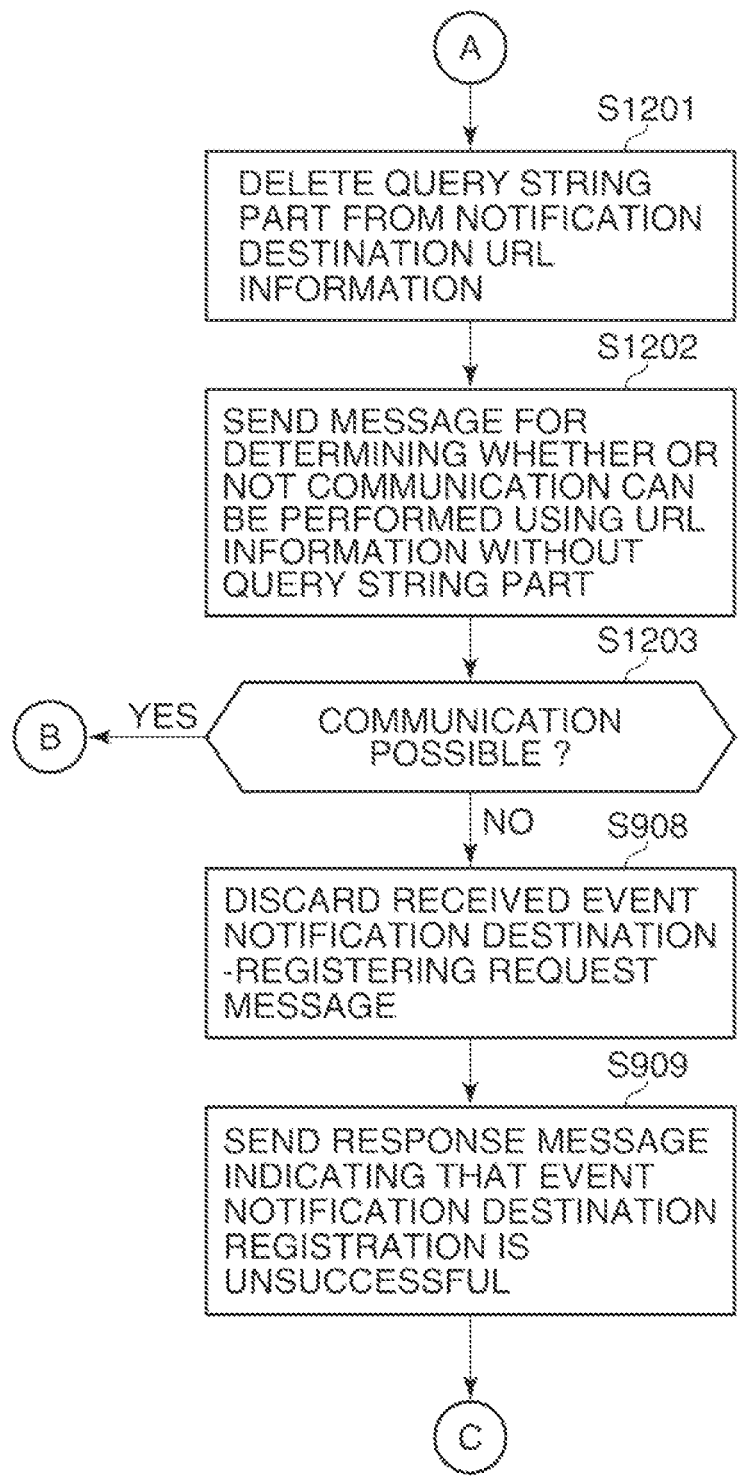

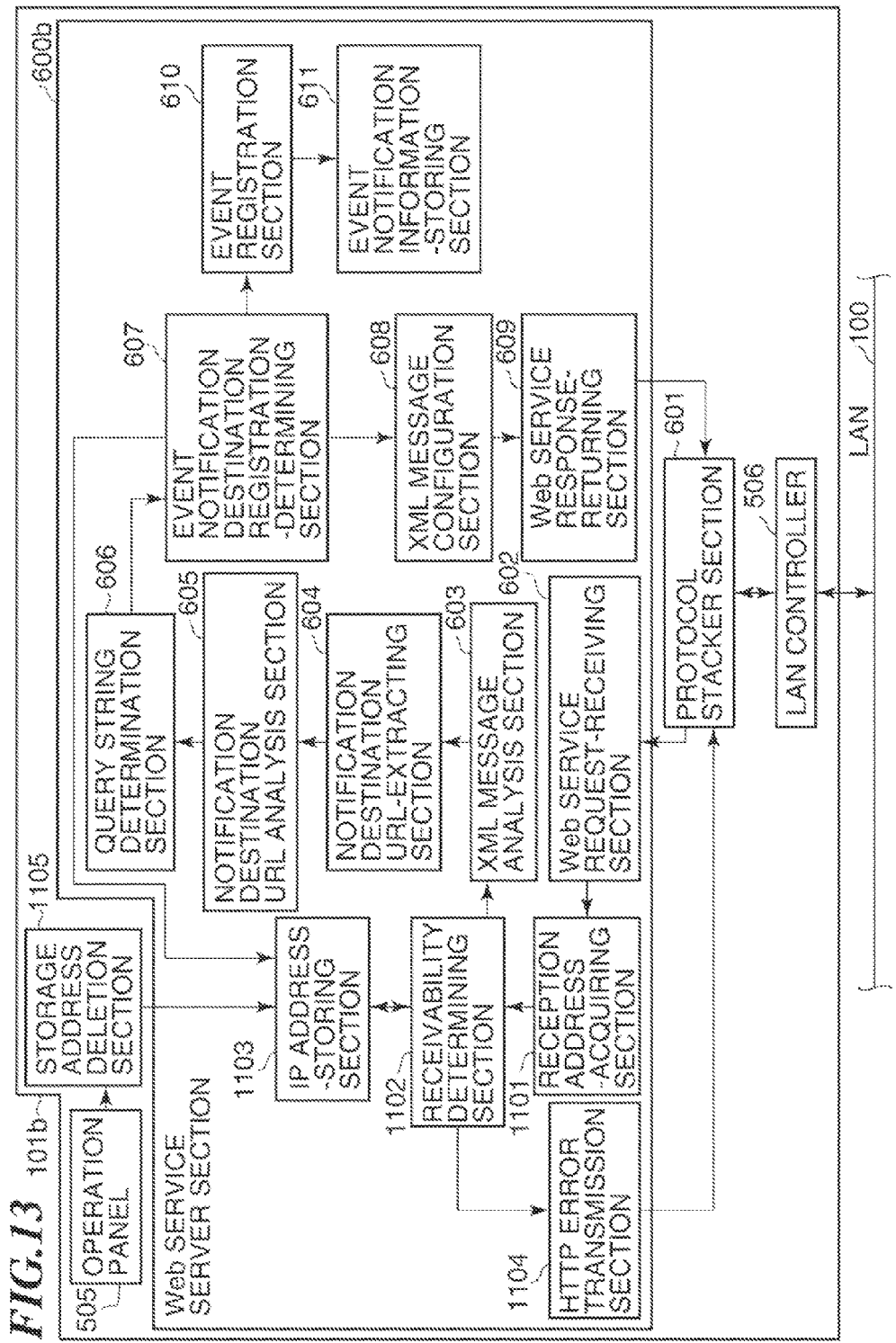

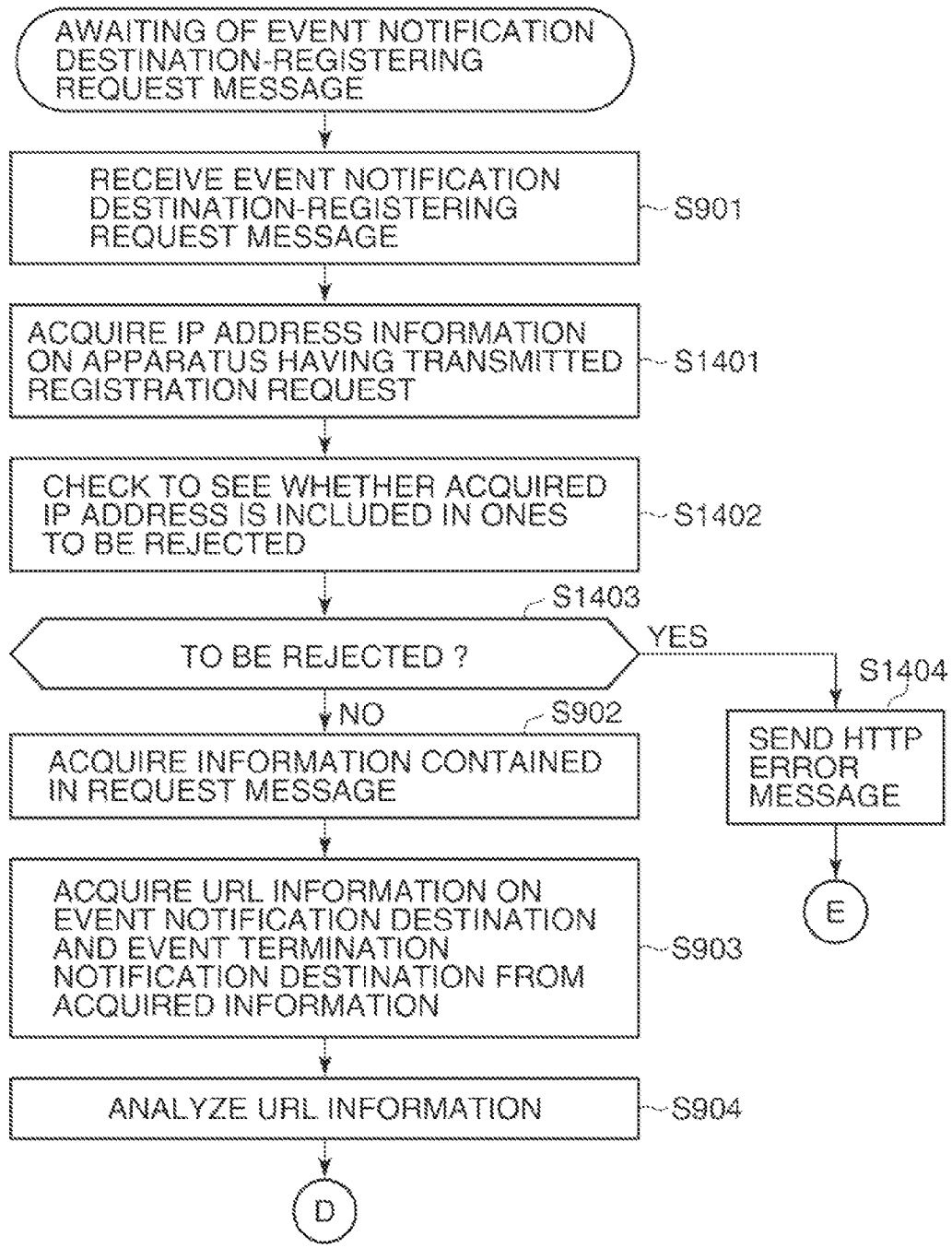

DATA PROCESSING APPARATUS THAT REGISTERS INFORMATION NOTIFICATION DESTINATION AND METHOD THEREFOR, AND STORAGE MEDIUM

BACKGROUND OF THE INVENTION

1. Field of the Invention

The present invention relates to a data processing apparatus and method which receives a registration request for requesting registration of an address of a notification destination, from an information processing apparatus, and notifies information concerning the data processing apparatus to the address of the notification destination.

2. Description of the Related Art

In recent years, the WS-Eventing (Web Services Eventing) has been proposed as a method in which an information processing apparatus receives information concerning a data processing apparatus from the data processing apparatus. Now, a description will be given of the outline of the WS-Eventing.

First, a message of an event notification destination-registering request containing information, such as the content of an event desired to be notified, a destination to which the event is notified (hereinafter referred to as "an event notification destination"), and so forth, is sent from the information processing apparatus to the data processing apparatus using the WS-Eventing. Next, the data processing apparatus that has received the event notification destination-registering request stores (registers) the information contained in the event notification destination-registering request. Then, when a corresponding event (event, such as an error, a job start, or a job end) occurs in the data processing apparatus, the data processing apparatus transmits an event notification message to the registered event notification destination. This is the outline of the WS-Eventing.

On the other hand, in the WS-Eventing, an apparatus different from the information processing apparatus that has transmitted the event notification destination-registering request can be designated as the event notification destination which is contained in the event notification destination-registering request.

By the way, information registered by the data processing apparatus that has received an event notification destination-registering request unexceptionally contains an event notification destination to which a notification is sent during occurrence of an event, as a URL. A method of registering a URL requested to be registered, as described above, is conventionally known (see Japanese Patent Laid-Open Publication No. 2004-192279).

When Web services are used, a Uniform Resource Locator (URL) is used as destination information for transmitting a request for use of the Web services. Recently, it is possible to send a request to permit use of the Web services from the information processing apparatus to the data processing apparatus, using destination information generated by adding to the URL a desired character string (query string) which is divided by a specific symbol.

When the Web service request is sent to the URL containing the query string, a server that has received the request carries out processing based on the query string contained in the request. If such a technique is employed, a Web mail system or the like can be easily constructed. More specifically, when a request formed by adding user information, password information, mail information, and so forth, as a query string, to a URL, is sent from a browser side, a Web mail server that has received the request searches mail information based on information contained in the request, and returns the results of the search to the browser side. Only if the user has a browser, he can view the mail on the browser which displays the returned results.

The information processing apparatus requests the data processing apparatus to register an event notification destination, for example, in the following cases: The information processing apparatus is not requested by an apparatus as an event notification destination to make a registration request, as a proxy, but automatically generates a destination URL by predicting a possible event notification destination, and requests the data processing apparatus to register the URL as the event notification destination. In this case, the event notification destination URL automatically generated by the information processing apparatus sometimes contains a query string.

If the data processing apparatus that has received the event notification destination-registering request registers the event notification destination containing the query string, an event notification message is sent from the data processing apparatus to the registered URL that contains the query string.

When the query string can be processed by an apparatus that has received the above-described event notification message, a response message indicating that the event notification message has been successfully received is sent from the apparatus having received the event notification message to the data processing apparatus as an event notification source. Data acquired based on the query string is added to the response message, and this data is sometimes very large. When the data processing apparatus receives the very large data, it takes much time to process the data, and during the data processing, the data processing apparatus cannot notify another event or make a request to register an event notification destination.

SUMMARY OF THE INVENTION

The present invention provides a data processing apparatus and method which are capable of preventing reception and processing of large data acquired based on a query string, thereby making it possible to prevent data reception and processing from affecting another event notification or registration request processing performed by the data processing apparatus, and a storage medium storing a program for executing the method.

In a first aspect of the present invention, there is provided a data processing apparatus connected to an information processing apparatus via a network, comprising a notification destination registration unit adapted to register a notification destination to which information concerning the data processing apparatus is to be notified, in a storage unit, a reception unit adapted to receive a registration request for requesting registration of the notification destination in the storage unit, from the information processing apparatus, an extraction unit adapted to extract destination information for identifying the notification destination from the registration request received by the reception unit, an analysis unit adapted to analyze the destination information extracted by the extraction unit, a character string determination unit adapted to determine whether or not the destination information contains a specific character string, based on a result of the analysis by the analysis unit, a registration permission decision unit adapted to decide whether or not to register the notification destination requested to be registered, according to a result of the determination by the character string determination unit, and a response unit adapted to send a result of the decision by the registration permission decision unit back to the information processing apparatus, wherein when the character string determination unit determines that the destination information contains the specific character string, the registration permission decision unit determines that the notification destination is not to be registered in the storage unit, and the response unit sends a response indicating that the notification destination has not been registered, back to the information processing apparatus.

In a second aspect of the present invention, there is provided a data processing apparatus connected to an information processing apparatus via a network, comprising a notification destination registration unit adapted to register a notification destination to which information concerning the data processing apparatus is to be notified, in a storage unit, a reception unit adapted to receive a registration request for requesting registration of the notification destination in the storage unit, from the information processing apparatus, an extraction unit adapted to extract destination information for identifying the notification destination from the registration request received by the reception unit, an analysis unit adapted to analyze the destination information extracted by the extraction unit, a character string determination unit adapted to determine whether or not the destination information contains a specific character string, based on a result of the analysis by the analysis unit, a registration permission decision unit adapted to decide whether or not to register the notification destination requested to be registered, according to a result of the determination by the character string determination unit, and a response unit adapted to send a response back to the information processing apparatus, wherein when the character string determination unit determines that the destination information contains the specific character string, the registration permission decision unit decides that the notification destination is not to be registered in the storage unit, and the response unit sends a response indicating that the notification destination has been normally registered, back to the information processing apparatus.

In a third aspect of the present invention, there is provided a data processing apparatus connected to an information processing apparatus via a network, comprising a notification destination registration unit adapted to register a notification destination to which information concerning the data processing apparatus is to be notified, in a storage unit, a reception unit adapted to receive a registration request for requesting registration of the notification destination in the storage unit, from the information processing apparatus, an extraction unit adapted to extract destination information for identifying the notification destination from the registration request received by the reception unit, an analysis unit adapted to analyze the destination information extracted by the extraction unit, a character string determination unit adapted to determine whether or not the destination information contains a specific character string, based on a result of the analysis by the analysis unit, a notification destination determination unit adapted to generate new destination information by deleting the specific character string from the destination information, according to a result of the determination by the character string determination unit, and a response unit adapted to send a response back to the information processing apparatus, wherein when the character string determination unit determines that the destination information contains the specific character string, the notification destination determination unit generates the new destination information by deleting the specific character string from the destination information, and the response unit sends a response indicating that the notification destination has been normally registered, back to the information processing apparatus.

In a fourth aspect of the present invention, there is provided a data processing method for a data processing apparatus connected to an information processing apparatus via a network, comprising registering a notification destination to which information concerning the data processing apparatus is to be notified, in a storage unit, receiving a registration request for requesting registration of the notification destination in the storage unit, from the information processing apparatus, extracting destination information for identifying the notification destination from the received registration request, analyzing the extracted destination information, determining whether or not the destination information contains a specific character string, based on a result of the analysis, deciding whether or not to register the notification destination requested to be registered, according to a result of the determination, and sending a result of the decision back to the information processing apparatus, wherein when the determining determines that the destination information contains the specific character string, the decision decides that the notification destination is not to be registered in the storage unit, and the sending sends a response indicating that the notification destination has not been registered, back to the information processing apparatus.

In a fifth aspect of the present invention, there is provided a data processing method for a data processing apparatus connected to an information processing apparatus via a network, comprising registering a notification destination to which information concerning the data processing apparatus is to be notified, in a storage unit, receiving a registration request for requesting registration of the notification destination in the storage unit, from the information processing apparatus, extracting destination information for identifying the notification destination from the received registration request, analyzing the extracted destination information, determining whether or not the destination information contains a specific character string, based on a result of the analysis, deciding whether or not to register the notification destination requested to be registered, according to a result of the determination, and sending a response back to the information processing apparatus, wherein when the determining determines that the destination information contains a specific character string, the decision decides that the notification destination is not to be registered in the storage unit, and the sending sends a response indicating that the notification destination has been normally registered, back to the information processing apparatus.

In a sixth aspect of the present invention, there is provided a data processing method for a data processing apparatus connected to an information processing apparatus via a network, comprising registering a notification destination to which information concerning the data processing apparatus is to be notified, in a storage unit, receiving a registration request for requesting registration of the notification destination in the storage unit, from the information processing apparatus, extracting destination information for identifying the notification destination from the received registration request, analyzing the extracted destination information, determining whether or not the destination information contains a specific character string, based on a result of the analysis, generating new destination information by deleting the specific character string from the destination information, according to a result of the determination, and sending a response back to the information processing apparatus, wherein when the determining determines that the destination information contains the specific character string, the generating generates the new destination information by deleting the specific character string from the destination information, and the sending sends a response indicating that the notification destination has been normally registered, back to the information processing apparatus.

In a seventh aspect of the present invention, there is provided a non-transitory computer-readable storage medium storing a computer-executable program for causing a computer to execute a data processing method for a data processing apparatus connected to an information processing apparatus via a network, wherein the method comprises registering a notification destination to which information concerning the data processing apparatus is to be notified, in a storage unit, receiving a registration request for requesting registration of the notification destination in the storage unit, from the information processing apparatus, extracting destination information for identifying the notification destination from the received registration request, analyzing the extracted destination information, determining whether or not the destination information contains a specific character string, based on a result of the analysis, deciding whether or not to register the notification destination requested to be registered, according to a result of the determination, and sending a result of the decision back to the information processing apparatus, wherein when the determining determines that the destination information contains the specific character string, the decision decides that the notification destination is not to be registered in the storage unit, and the sending sends a response indicating that the notification destination has not been registered, back to the information processing apparatus.

In an eighth aspect of the present invention, there is provided a non-transitory computer-readable storage medium storing a computer-executable program for causing a computer to execute a data processing method for a data processing apparatus connected to an information processing apparatus via a network, wherein the method comprises registering a notification destination to which information concerning the data processing apparatus is to be notified, in a storage unit, receiving a registration request for requesting registration of the notification destination in the storage unit, from the information processing apparatus, extracting destination information for identifying the notification destination from the received registration request, analyzing the extracted destination information, determining whether or not the destination information contains a specific character string, based on a result of the analysis, deciding whether or not to register the notification destination requested to be registered, according to a result of the determination, and sending a response back to the information processing apparatus, wherein when the determining determines that the destination information contains the specific character string, the decision decides that the notification destination is not to be registered in the storage unit, and the sending sends a response indicating that the notification destination has been normally registered, back to the information processing apparatus.

In a ninth aspect of the present invention, there is provided a non-transitory computer-readable storage medium storing a computer-executable program for causing a computer to execute a data processing method for a data processing apparatus connected to an information processing apparatus via a network, wherein the method comprises registering a notification destination to which information concerning the data processing apparatus is to be notified, in a storage unit, receiving a registration request for requesting registration of the notification destination in the storage unit, from the information processing apparatus, extracting destination information for identifying the notification destination from the received registration request, analyzing the extracted destination information, determining whether or not the destination information contains a specific character string, based on a result of the analysis, generating new destination information by deleting the specific character string from the destination information, according to a result of the determination, and sending a response back to the information processing apparatus, wherein when the determining determines that the destination information contains the specific character string, the generating generates the new destination information by deleting the specific character string from the destination information, and the sending sends a response indicating that the notification destination has been normally registered, back to the information processing apparatus.

According to the present invention, it is possible to prevent reception and processing of large data acquired based on a query string, thereby making it possible to prevent data reception and processing from affecting another event notification or registration request processing performed by the data processing apparatus.

Further features of the present invention will become apparent from the following description of exemplary embodiments with reference to the attached drawings.

BRIEF DESCRIPTION OF THE DRAWINGS

FIG. 3 is a block diagram of the software configuration of the MFP.

FIG. 4A is a diagram showing an example of a registration request message generally transmitted for requesting registration of an event notification destination.

FIG. 4B is a diagram showing an example of a response message sent in response to the registration request message in FIG. 4A.

FIG. 5A is a diagram showing an example of an event notification message sent when an event occurs.

FIG. 5B is a diagram showing an example of a response message sent in response to the Message in FIG. 5A.

FIGS. 6A and 6B are diagrams showing examples of messages that a server apparatus uses when providing Web mail service.

FIG. 7A is a diagram showing an example of a registration request message sent to a query string-containing URL for requesting registration of an event notification destination.

FIG. 7B is a diagram showing an example of an event notification message.

FIG. 8 is a diagram showing an example of an error message transmitted from the MFP to a PC.

FIGS. 12A and 12B are a flowchart of a process executed by a Web service server section appearing in FIG. 11.

FIG. 13 is a block diagram of the software configuration of an MFP as a data processing apparatus according to a fourth embodiment of the present invention.

FIGS. 14A and 14B are a flowchart of a process executed by the Web service server section appearing in FIG. 13.

DETAILED DESCRIPTION OF THE EMBODIMENTS

The present invention will now be described in detail below with reference to the accompanying drawings showing embodiments thereof.

Figure 1:
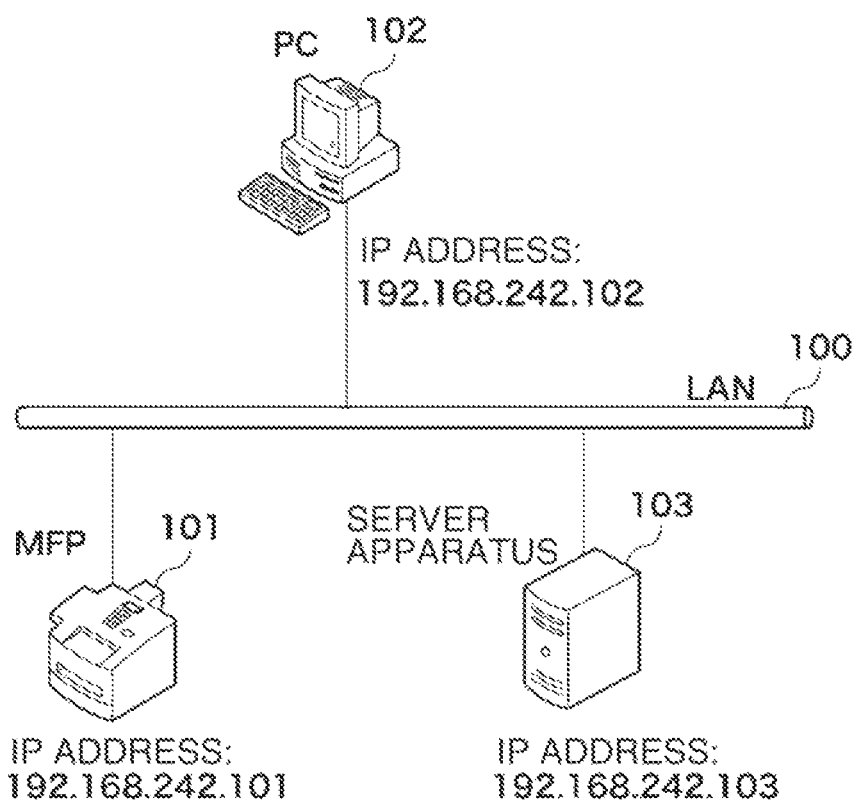
FIG. 1 is a network configuration diagram showing an example of a network environment to which is connected an MFP that is a data processing apparatus according to a first embodiment of the present invention.

FIG. 1 is a network configuration diagram showing an example of a network environment to which is connected an MFP that is a data processing apparatus according to a first embodiment of the present invention.

In the illustrated example of a network, all the apparatuses including apparatuses described hereinafter are connected to a LAN 100, and have respective IP addresses assigned thereto, which include e.g. one defined by a network address of 192.168.242.0 and a subnet mask 255.255.255.0.

A personal computer (PC) 102 is an information processing apparatus which transmits an event notification destination-registering request to an MFP 101. The IP address of 192.168.242.102 is assigned to the PC 102. The MFP 101 is a data processing apparatus having a printer function, a scanner function, a facsimile function, and so forth. The MFP 101 receives the event notification destination-registering request from the PC 102, and when an event occurs, notifies the PC 102 of the event. An IP address of 192.168.242.101 is assigned to the MFP 101.

A server apparatus 103 is a notification destination to which an event notification is actually transmitted from the MFP 101. In the present embodiment, it is assumed that the server apparatus 103 provides a Web mail system. An IP address of 192.168.242.103 is assigned to the server apparatus 103.

The LAN 100 may be connected to all the apparatuses via a router, for example. The network address, the subnet mask, and the IP address of each apparatus may be set as desired. Further, the server apparatus 103 may be a desired apparatus other than a server that provides the Web mail system.

Next, a description will be given of the hardware configuration of the MFP 101 illustrated in FIG. 1.

Figure 2:
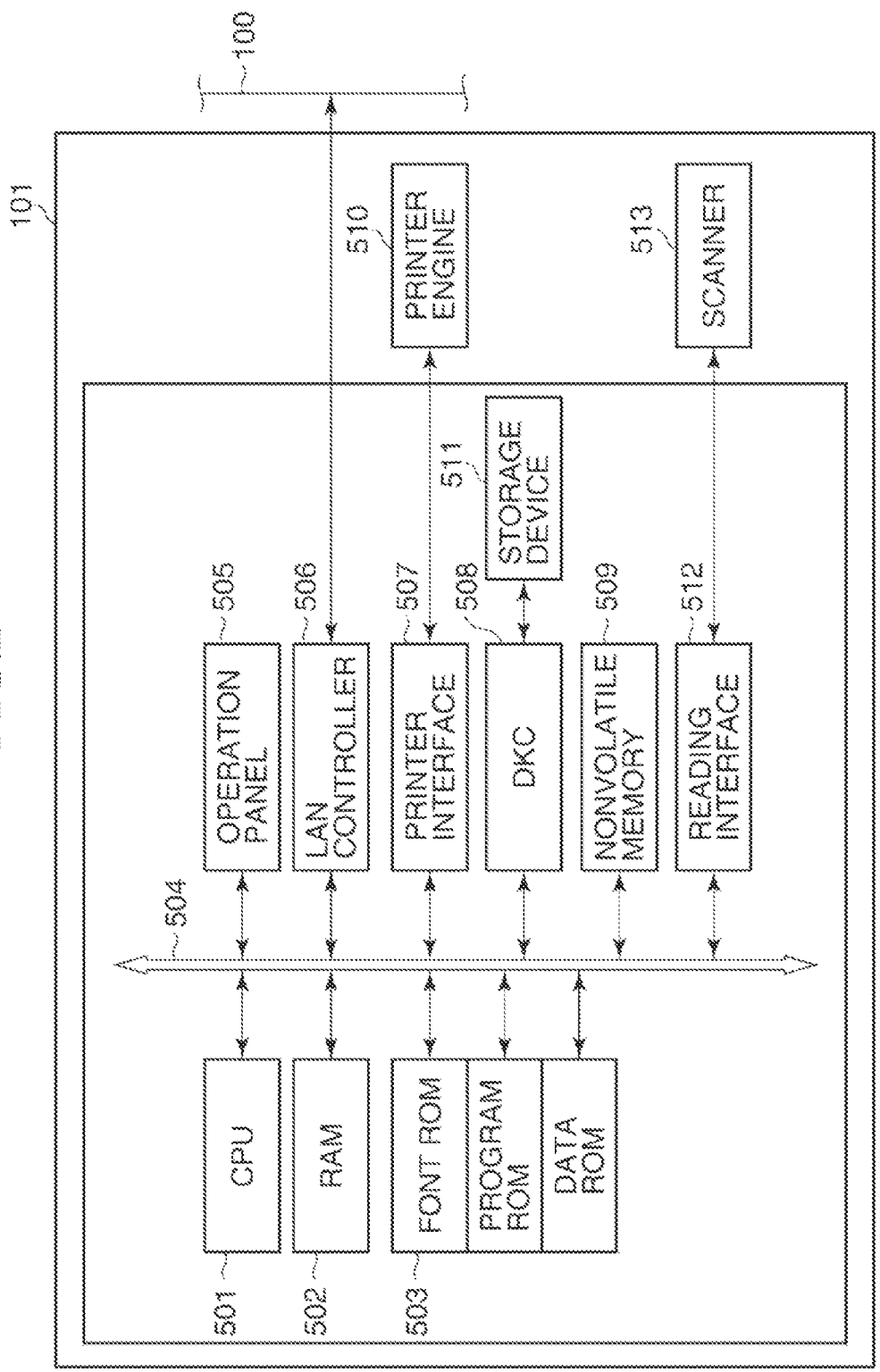
FIG. 2 is a block diagram of the hardware configuration of the MFP appearing in FIG. 1.

FIG. 2 is a block diagram of the hardware configuration of the FIG. 1 MFP 101.

Referring to FIG. 2, a CPU 501 performs centralized control of access to devices connected to a system bus 504, according to control programs stored in a program ROM (Read Only Memory) which forms a ROM 503. Further, the CPU 501 delivers an image signal as output information to a printer section (printer engine) 510 that is connected via a printer interface 507. Furthermore, the CPU 501 controls an image signal input from a reading section (scanner) 513 that is connected via a reading interface 512.

The program ROM forming the ROM 503 stores control programs executable by the CPU 501, and the like. A font ROM forming the ROM 503 stores font data (including outline font data) used for generating the above-mentioned output information, and the like. A data ROM forming the ROM 503 stores information used in the MFP, and the like.

The CPU 501 is capable of communicating with the PC 102, the server apparatus 103, and the like on the LAN 100 via a LAN controller (NIC) 506. A RAM 502 mainly functions as a main memory, a work area, or the like of the CPU 501, and is configured such that the memory capacity thereof can be increased by using an optional RAM connected to an expansion port, not shown. Further, the RAM 502 is used e.g. as an output information loading area and an environment data storage area.

A storage device 511 includes a memory, such as a hard disk (HD) or an IC card, and access thereto is controlled by a disk controller (DKC) 508. The storage device 511 stores font data, an emulation program, form data, and so forth, and is used as a job storage area for temporarily spooling a print job and allowing the spooled print job to be controlled from outside. Further, the storage device 511 is also used as a box data storage area where image data read from the scanner 513 and image data of the print job are stored as box data which is referred to from the network for printing. Further, there may be provided one or more storage devices 511, or the storage device 511 may be configured such that a plurality of option font cards supplementing internal fonts and external memories storing programs for interpreting printer control languages of different language systems can be connected thereto.

An operation panel 505 is configured such that a user can input various information with software keys via the operation panel 505. A nonvolatile memory 509 stores various setting information configured via the operation panel 505.

Further, the MFP 101 is configured such that various types of expansion devices, such as a finisher for executing a stapling function and a sorting function, and a double-sided printing apparatus for realizing a double-sided printing function, can be optionally connected thereto. Operations for executing the above functions are controlled by the CPU 501.

Next, a description will be given of the software configuration of the MFP 101 appearing in FIG. 1.

FIG. 3 is a block diagram of the software configuration of the FIG. 1 MFP 101.

Software in the MFP 101 can be roughly divided into the LAN controller 506, a protocol stacker section 601 for controlling protocols, such as HTTP, TCP, and IP, and a Web service server section 600 for providing a Web service.

The protocol stacker section 601 processes received or transmitted data up to an HTTP header. For example, when the MFP 101 receives a message, described hereinafter with reference to FIG. 7A, the protocol stacker section 601 processes the first two lines of the message. After that, the protocol stacker section 601 passes part of the message described in the XML (Extensive Markup Language) (hereinafter referred to as "the XML message) to the Web service server section 600, and he Web service server section 600 processes the XML message.

In the Web service server section 600, a Web service request-receiving section 602 has the function of receiving the XML message. An XML message analysis section 603 has the function of analyzing the received XML message to extract predetermined information therefrom. A notification destination URL-extracting section 604 has the function of extracting the information on a notification destination URL (Uniform Resource Locator) from the information extracted by the XML message analysis section 603. The information on the notification destination URL is destination information for use in identifying a notification destination, and contains a URL of an event notification destination, a URL of a notification destination to which termination of event notification destination registration is notified, etc.

A notification destination URL analysis section 605 analyzes the notification destination URL extracted by the notification destination URL-extracting section 604. A query string determination section 606 determines as a character string determination unit whether or not the notification destination URL contains a character string indicative of a specific character string, i.e. a query string, according to the result of the analysis by the notification destination URL analysis section 605. Based on the result of this determination, an event notification destination registration-determining section 607 determines whether or not to register the event notification destination. When registering the event notification destination, the event notification destination registration-determining section 607 passes information to an event registration section 610, and the information is stored in an event notification information-storing section 611.

An XML message configuration section 608 generates a response message irrespective of whether or not registration of the event notification destination is performed. Then, a Web service response-returning section 609 executes a response by sending the response message back to the LAN 100 via the protocol stacker section 601 and the LAN controller 506.

Next, the contents of messages for use in communication under the Network environment in FIG. 1 will be described with reference to FIGS. 4A to 8.

Although it is assumed that each message is configured using XML and is transmitted and received using HTTP (Hypertext Transfer Protocol), this is not limitative, but a message format and a protocol other than the above may be employed.

FIGS. 4A and 4B show examples of messages generally transmitted and received when an event notification destination-registering request is issued. FIGS. 5A and 5B show examples of actual event notification messages.

The message illustrated in FIG. 4A is an XML message sent to the MFP 101 from the PC 102 so as to request registration of an event notification destination. As shown in FIG. 4A, the value of an "Action" element in Line 201 is "Subscribe", which shows that this XML message is for making an event notification destination-registering request.

Line 202 contains a description of a destination URL to which a message is transmitted when the registration is terminated e.g. due to restarting of the MFP 101 after the MFP 101 has registered the event notification destination. For example, when the power of the MFP 101 is turned off, the fact (that the power of the MFP 101 is turned off) is notified to the URL described in Line 202. Line 203 contains a description of a destination URL to which the MFP 101 actually notifies an event. In the example illustrated in FIG. 4A, the IP address of the server apparatus 103 is described in Lines 202 and 203 as the destination URL. Here, the destination URLs shown in Lines 202 and 203 are not necessarily required to be a URL of the same apparatus, but they may be URLs of apparatuses different from each other. Since Lines 202 and 203 are destinations to which a message is transmitted based on some event having occurred in the MFP 101, Lines 202 and 203 are each referred to as "an event notification destination" in the following description.

Line 204 is for the PC 102 to designate which of events is to be notified to the destination URL in Line 203 when it occurs. In the example illustrated in FIG. 4A, "JobEndEvent" is described in Line 204, and hence the MFP 101 is requested to send an event notification to the destination URL upon termination of a job.

The XML message illustrated in FIG. 4B is a response message sent in response to the FIG. 4A notification message, and is transmitted from the MFP 101 to the PC 102. Line 205 contains a description of a content indicating that the HTTP communication has been normally performed. The "Action" element in Line 206 is "SubscribeResponse", which indicates that this XML message is a response message to the message shown in FIG. 4A.

The message illustrated in FIG. 5A is an event notification message transmitted when an event has occurred in the MFP 101, and is sent from the MFP 101 to the server apparatus 103. The character string "JobEndEvent" in Line 207 indicates that this message notifies the server apparatus 103 of termination of a job.

The message illustrated in FIG. 5B is a response message sent in response to the notification message in FIG. 5A, and is transmitted from the server apparatus 103 to the MFP 101. In the example illustrated in FIG. 5B, it is assumed that no XML message is particularly contained.

FIGS. 6A and 6B show examples of messages that the server apparatus 103 uses when providing a Web mail service. In the examples illustrated in FIGS. 6A and 6B, not XML but Hypertext Markup Language (HTML) is used.

The message shown in FIG. 6A is transmitted from an arbitrary apparatus (not shown) desiring to use the server apparatus 103 thereto. The message in the example illustrated in FIG. 6A contains a query string in Line 301. Here, character strings "usr", "pw", and "id" contained in the query string represent a user name, a password, and a mail ID, respectively. The query string may contain character strings other than the above. Further, although many Web servers use not a POST method but a GET method for requests containing query strings, it is known that some servers accept query strings even if requests containing the query strings are made by the POST method.

The message illustrated in FIG. 6B is a response message sent in response to the message in FIG. 6A, and is transmitted from the server apparatus 103 to the apparatus having transmitted the event notification destination-registering request. Line 302 contains a main body of the mail corresponding to the contents of the query string contained in Line 301.

FIGS. 7A and 7B are diagrams showing examples of messages transmitted and received when an event notification destination-registering request is made in the present embodiment. FIG. 8 is a diagram showing an example of an actual event notification message.

The message shown in FIG. 7A is an example of an event notification destination-registering request message sent to a query string-containing URL for requesting registration of an event notification destination. The message is sent from the PC 102 to the MFP 101. In this message shown in FIG. 7A, Lines 202 and 203 of the FIG. 4A message are changed to Lines 401 and 402, respectively.

The message shown in FIG. 7B is an event notification message which is transmitted to the server apparatus 103 when an event occurs in the MFP 101 after the MFP 101 registering the contents of the message shown in FIG. 7A. The Event notification message in FIG. 7B is different from the message in FIG. 5A in that Line 403 contains a query string.

FIG. 8 is a diagram showing an example of an error message which is transmitted from the MFP 101 to the PC 102 when the registration of the event notification destination cannot be performed for some reason in spite of having received the event notification destination-registering request message in FIG. 7A.

In FIG. 8, a character string "Regist Error" in Line 404 indicates that the registration is unsuccessful.

Now, a situation where the problem described hereinbefore can occur will be described with reference to FIG. 6B and FIGS. 7A and 7B.

For example, the PC 102 transmits the message shown in FIG. 7A to the MFP 101, and the MFP 101 registers the URL of the event notification destination described in Lines 401 and 402. After that, when an event occurs in the MFP 101, the MFP 101 transmits the event notification message illustrated in FIG. 7B to the server apparatus 103. The Message shown in FIG. 6B is sent from the server apparatus 103 to the MFP 101 as an HTTP response message to the event notification. Upon reception of the message shown in FIG. 6B, the MFP 101 is required to process data (Line 302) contained in the HTTP response message, which normally would not be required to be processed. This causes unnecessary load to act on the MFP 101. This is an example of the problem to be solved by the present invention.

Figure 9:
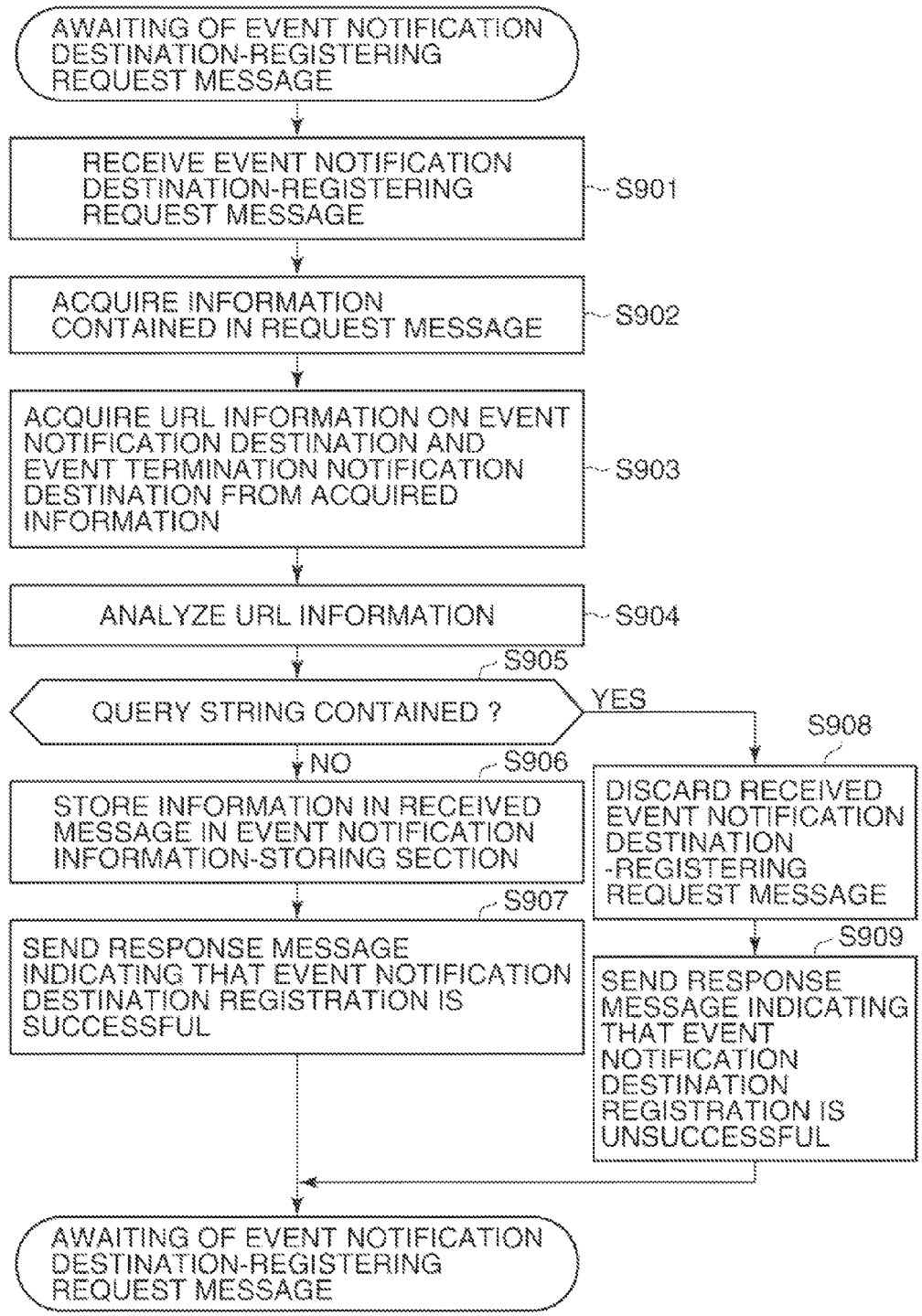
FIG. 9 is a flowchart of a process executed by a Web service server section.

FIG. 9 is a flowchart of a process executed by the Web service server section 600.

The MFP 101 receives the event notification destination-registering request message shown in FIG. 7A transmitted from the PC 102, using the LAN controller 506. Then, the protocol stacker section 601 extracts an XML message from the message, and the Web service request-receiving section 602 receives the XML message (step S901).

Next, the XML message analysis section 603 analyzes the received XML message, and acquires the value of an "Action" tag in Line 201, the value of an "EndTo" tag in Line 401, and the value of a "NotifyTo" tag in Line 402, contained in the message (step S902).

Next, the notification destination URL-extracting section 604 extracts the information on a notification destination URL from the values acquired in the step S902 (step S903). As described above, this information on the notification destination URL contains the event notification destination and the URL of the notification destination to which the termination of event notification destination registration is notified, described in Lines 401 and 402, and so forth.

Next, the notification destination URL analysis section 605 analyzes the information on the notification destination URL to determine what character string is contained in the information extracted in the step S903 (step S904). Then, the query string determination section 606 determines whether or not a character string indicative of a query string is contained in the notification destination URL information. Further, the event notification destination registration-determining section 607 determines whether or not to register an event notification destination (step S905). In short, the event notification destination registration-determining section 607 determines whether the registration request message is of the FIG. 4A type or the FIG. 7A type. If the registration request message is of the FIG. 4A type, it is determined that the event notification destination is to be registered, whereas if the registration request message is of the FIG. 7A type, it is determined that the event notification destination is not to be registered.

If it is determined that no character string indicative of a query string is contained and hence the event notification destination is to be registered (NO to the step S905), the event registration section 610 stores necessary information in the event notification information-storing section 611, and registers the event notification destination (step S906). The term "necessary information" is intended to mean information as to which of events is to be notified to the destination URL when it occurs, a notification destination to which the termination of event notification destination registration is notified, the event notification destination, and so forth.

On the other hand, if it is determined that a character string indicative of a query string is contained and hence the event notification destination is not to be registered (YES to the step S905), the event notification destination registration-determining section 607 discards the received event notification destination-registering request message (step S908). Then, the XML message configuration section 608 generates a response message, and the Web service response-returning section 609 returns the response message to the PC 102 (step S909).

As to the transmitted response message, when the event notification destination has been registered, the XML message configuration section 608 generates a message shown in FIG. 4B, and the Web service response-returning section 609 returns the message to the PC 102 (step S907). When the event notification destination has not been registered, the XML message configuration section 608 generates an error message shown in FIG. 8, and the Web service response-returning section 609 returns the message to the PC 102 (step S909).

According to the above-described first embodiment, the event notification destination-registering request for requesting registration of the query string-containing URL of the event notification destination is discarded to prevent transmission of an event notification to such a destination URL as described above, thereby preventing reception of very large data based on the query string. This makes it possible to perform data processing without taking much time, whereby it is possible to prevent another event notification or registration request processing from being adversely affected by the data processing.

A data processing apparatus according to a second embodiment of the present invention is constructed similarly to the data processing apparatus according to the first embodiment in respect of the configurations shown in FIGS. 1 to 3. Therefore, the same components as those in the first embodiment are denoted by the same reference numerals and a detailed description thereof is omitted. The following description is given of only different points from the first embodiment.

Figure 10:
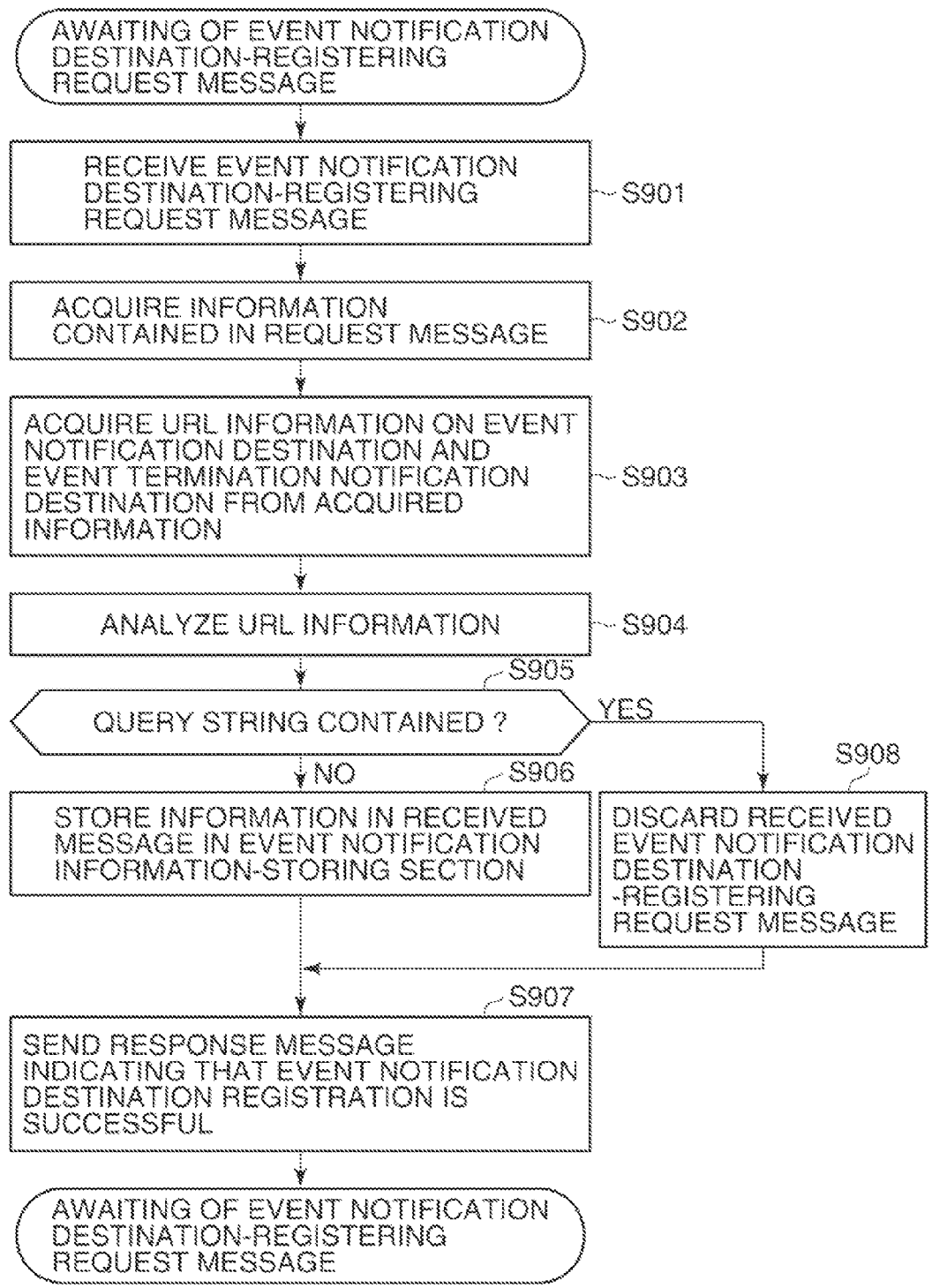
FIG. 10 is a flowchart of a process executed by a Web service server section of an MFP as a data processing apparatus according to a second embodiment of the present invention.

FIG. 10 is a flowchart of a process executed by the Web service server section 600 of the MFP 101 as the data processing apparatus according to the second embodiment of the present invention. In the process illustrated in FIG. 10, steps identical to those in FIG. 9 are denoted by the same step numbers, and description thereof is omitted.

The process shown in FIG. 10 is distinguished from the process shown in the FIG. 9 only in an operation that is carried out when the MFP 101 receives the message shown in FIG. 7A, for extracting the information on the notification destination URL containing the query string. First, the notification destination URL analysis section 605 analyzes the information on the notification destination URL to determine what character string is contained in the extracted information (step S904). Then, the query string determination section 606 determines whether or not a query string is contained in the information (step S905). As a result of the determination, if the event notification destination registration-determining section 607 determines that the event notification destination is not registered since a query string is contained (YES to the step S905), the process proceeds to the step S908.

In the step S908, the event notification destination registration-determining section 607 discards the received event notification destination-registering request message (step S908). Then, the XML message configuration section 608 generates a message indicative of success of the registration, and the Web service response-returning section 609 returns the message to the PC 102 (step S907).

According to the above-mentioned second embodiment, while discarding the event notification destination-registering request for requesting registration of the query string-containing URL, a message indicative of successful registration of the event notification destination is sent back to the PC having transmitted the event notification destination-registering request. Thus, after that, it is possible to block a request for registration of a query string-containing URL, from the PC 102.

A data processing apparatus according to a third embodiment of the present invention is constructed similarly to the data processing apparatus according to the first embodiment in respect of the configurations shown in FIGS. 1 and 2. Therefore, the same components as those in the first embodiment are denoted by the same reference numerals and a detailed description thereof is omitted. In the present embodiment, the MFP 101 in the first embodiment corresponds to an MFP 101*a*.

In the present embodiment, differently from the above-described first embodiment, when the MFP 101*a* receives an event notification destination-registering request message, if the information on a URL of an event notification destination contains a query string, the event notification destination is registered after a query string part is removed from the URL. Further, in the present embodiment, to determine whether or not an event notification can actually be transmitted, some message is sent for a trial before registration of the event notification destination, and only after confirming that the message can be transmitted, the event notification destination is registered.

Figure 11:
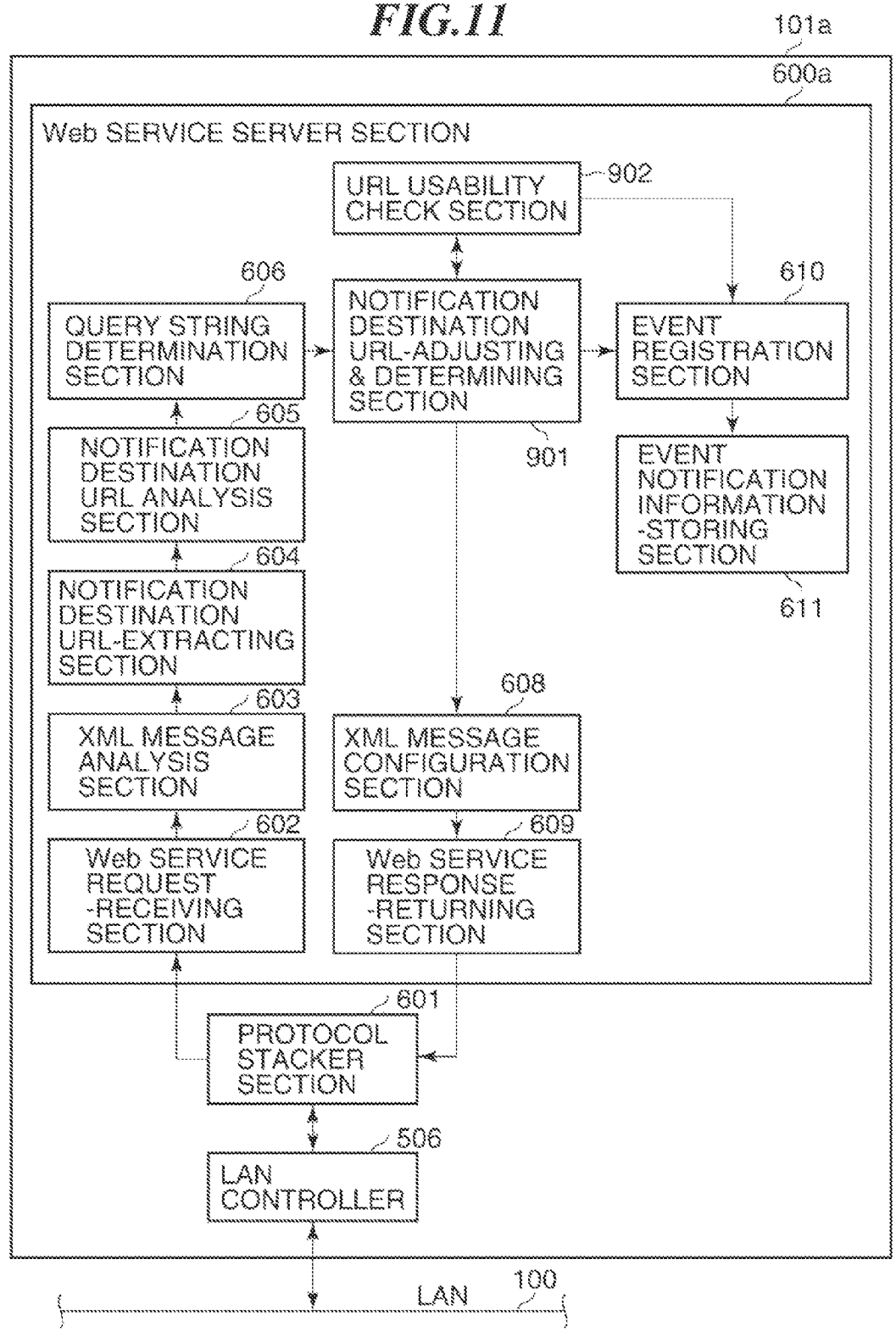
FIG. 11 is a block diagram of the software configuration of an MFP as a data processing apparatus according to a third embodiment of the present invention.

FIG. 11 is a block diagram of the software configuration of the MFP 101*a* as a data processing apparatus according to the third embodiment of the present invention.

A Web service server section 600*a* includes a notification destination URL-adjusting & determining section 901 and a URL usability check section 902 in place of the event notification destination registration-determining section 607 appearing in FIG. 3. The notification destination URL-adjusting & determining section 901 as a notification destination-determining unit has the function of generating a new notification destination by deleting only a query string part from the notification destination URL if the notification destination URL information contains the query string. The URL usability check section 902 determines whether or not it is possible to actually communicate with a destination indicated by the notification destination URL information, from which the query string part has been deleted by the notification destination URL-adjusting & determining section 901. That is, the URL usability check section 902 as a communicability determination unit determines whether or not communication can be performed using new destination information formed by eliminating the query string.

FIGS. 12A and 12B are a flowchart of a process executed by the FIG. 11 Web service server section 600*a*. In the process illustrated in FIGS. 12A and 12B, steps identical to those in FIG. 9 are denoted by the same step numbers, and description thereof is omitted.

If it is determined in the step S905 that a query string is contained in the information on the notification destination URL, the notification destination URL-adjusting & determining section 901 deletes a query string part from the information to generate new notification destination URL information (step S1201). When registering the notification destination URL information having the query string part deleted therefrom, the URL usability check section 902 sends a message (probe message) based on the new notification destination URL information without the query string part (step S1202), and determines whether or not communication using the new notification destination URL information can be performed (step S1203). This sequence of processing steps may be executed before registration of the event notification destination or when a first event notification is sent after registration of the event notification destination. Further, in some cases, it is not necessary to perform the sequence of processing steps.

If it is determined in the steps S1201 to 1203 that transmission using the new notification destination URL information can be performed, or when a URL having no query string contained therein originally is about to be registered, after registering necessary information in the event notification information-storing section 611 (step S906), and the message illustrated in FIG. 4B is transmitted to the PC 102 (step S907).

If it is determined in the steps S1201 to 1203 that the transmission cannot be performed (NO to the step S1203), the event notification destination registration-determining section 607 discards the received event notification destination-registering request message (step S908). Then, the XML message configuration section 608 generates the error message illustrated in FIG. 8, and the Web service response-returning section 609 sends the message back to the PC 102 (step S909).

On the other hand, if it is determined in the step 1203 that the communication using the new notification destination URL information can be performed, the process proceeds to the step S906, wherein the event notification destination is registered as described above.

According to the above-described third embodiment, when a query string is contained in the information on a notification destination URL requested to be registered, the query string part is deleted. This makes it possible to prevent reception of large data based on the query string while maintaining only the function of notifying events to the server apparatus 103.

Further, in the present embodiment, there is provided the function of determining whether or not an event notification can actually be transmitted to notification destination URL information having a query string part deleted therefrom. This makes it possible to prevent wasteful registration of an event notification destination.

A data processing apparatus according to a fourth embodiment of the present invention is constructed similarly to the data processing apparatus according to the first embodiment in respect of the configurations shown in FIGS. 1 and 2. Therefore, the same components as those in the first embodiment are denoted by the same reference numerals and a detailed description thereof is omitted. The following description is given of only different points from the first embodiment.

In the present embodiment, when the PC 102 requests an event to be notified to a destination indicated by notification destination URL information which contains a query string, the MFP 101 rejects the event notification destination registration requested by the PC 102 thereafter. The rejected registration can be checked via a user interface (UI), whereby the user can cancel settings for the rejection of the notification destination registration.

FIG. 13 is a block diagram of the software configuration of an MFP 101*b* according to the fourth embodiment of the present invention. The example illustrated in FIG. 13 includes the operation panel 505 as hardware.

A Web service server section 600*b* comprises not only the sections of the Web service server section 600 shown in FIG. 3 but also a reception address-acquiring section 1101, a receivability-determining section 1102, an IP address-storing section 1103, and an HTTP error transmission section 1104. The MFP 101*b* includes a storage address deletion section 1105.

The IP addresses mentioned above, notification destination-registering requests from which are to be rejected, are stored in the IP address-storing section 1103. The reception address-acquiring section 1101 acquires IP address information on the transmission source of an message of each event notification destination-registering request. In the illustrated example, the reception address-acquiring section 1101 acquires the network address 192.168.242.102 of the PC 102.

The receivability-determining section 1102 as an address determination unit determines whether or not the acquired IP address has been stored in the IP address-storing section 1103. If the acquired IP address has been stored, the receivability-determining section 1102 determines that the event notification destination-registering request therefrom is to be rejected. Then, the HTTP error transmission section 1104 transmits an error message to the PC 102 via the protocol stacker section 601. It is possible to request deletion of each IP address stored in the IP address-storing section 1103, via the operation panel 505. When the deletion request is received, the IP address selected by the storage address deletion section 1105 is deleted.

Figure 14B:
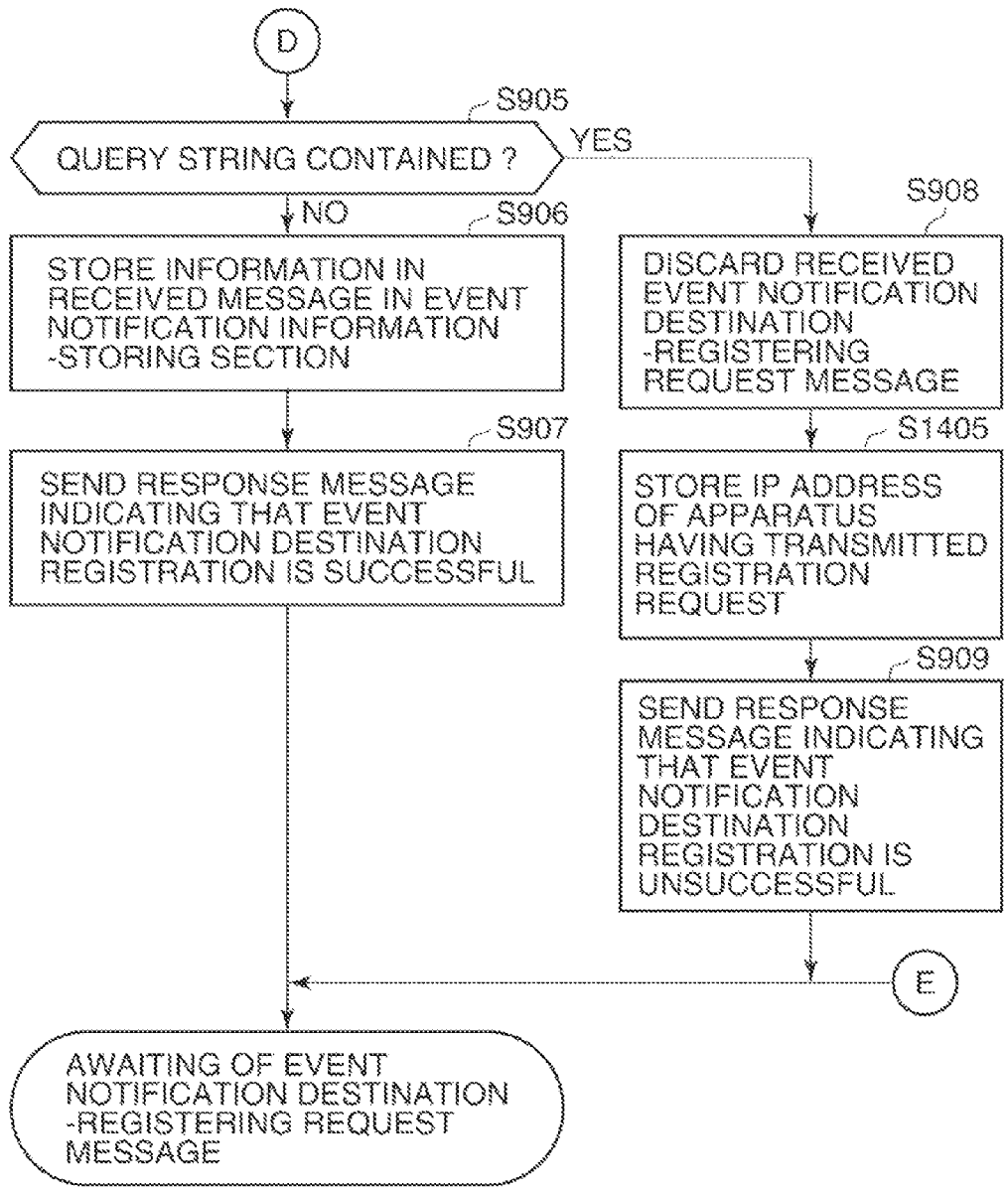

FIGS. 14A and 14B are a flowchart of a process executed by the Web service server section 600b showing in FIG. 13. In the process illustrated in FIGS. 14A and 14B, steps identical to those in FIG. 9 are denoted by identical step numbers, and description thereof is omitted.

In the present embodiment, upon receipt of the event notification destination-registering request message shown in FIG. 7A, the Web service request-receiving section 602 checks the transmission source of the message before analysis of the XML message.

In a step S1401 following the step S901, the reception address-acquiring section 1101 acquires IP address information on the transmission source of the received message. Next, the receivability-determining section 1102 compares the acquired IP address with the IP addresses stored in the IP address-storing section 1103 (step S1402), and determines whether or not the stored IP addresses include one matching the acquired IP address (step S1403). As a result of the determination, if the stored IP addresses include one matching the acquired IP address (YES to the step S1403), the HTTP error transmission section 1104 rejects the event notification destination-registering request received this time, and sends an HTTP error message to the transmission source of the message (step S1404). Although the HTTP error message is sent in the illustrated example, the Web service error message shown in FIG. 8 may be sent.

On the other hand, if it is determined in the step S1403 that the stored IP addresses do not include any IP address matching the acquired IP address (NO to the step S1403), the receivability-determining section 1102 passes the XML message to the XML message analysis section 603 so as to continue the processing of the XML message. Then, the steps S902 et seq. are executed.

If the event notification destination is not registered, and the event notification destination-registering request message illustrated in FIG. 7A is discarded by the event notification destination registration-determining section 607 (step S908), the process proceeds to a step S1405. In the step S1405, the event notification destination registration-determining section 607 stores IP address information on the apparatus (PC 102 in the illustrated example) having transmitted the event notification destination-registering request in the IF address-storing section 1103, and then the process proceeds to the step S909. In the step S909, the XML message configuration section 608 generates the error message illustrated in FIG. 8, and the Web service response-returning section 609 sends the message back to the PC 102 (step S909).

Next, a description will be given of the user interface operated when the MFP 101b rejects the event notification destination-registering request.

In the present embodiment, the IP address information stored in the IP address-storing section 1103 can be checked using the user interface displayed on the operation panel 505, for enabling the user to cancel a state where the event notification destination registration is rejected.

Figure 15:
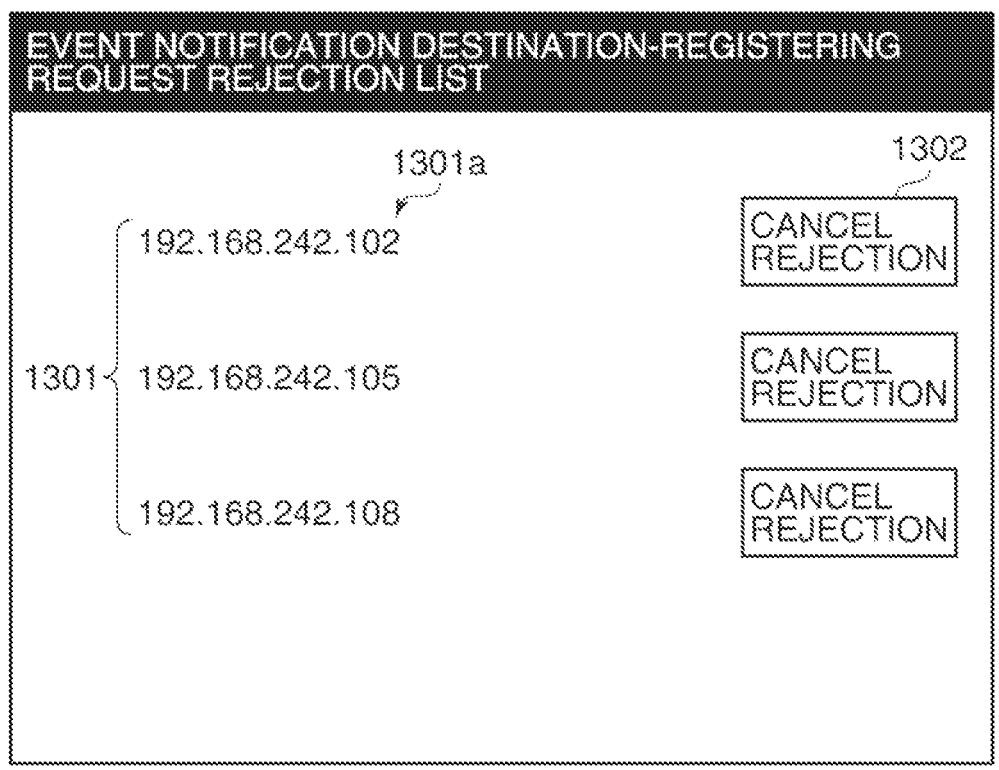
FIG. 15 is a diagram showing an example of a user interface displayed on an operation panel of the MFP.

FIG. 15 is a diagram showing an example of the user interface displayed on the operation panel 505 of the MFP 101b.

The user interface illustrated in FIG. 15 is a touch panel implementing the operation panel 505. The user can change the settings for rejecting event notification destination registration, through operations made by touching the touch panel.

On a screen of an event notification destination-registering request rejection list, illustrated in FIG. 15, a reference numeral 1301 denotes a list of IP addresses stored in the IP address-storing section 1103. The list displays IP addresses of apparatuses which have transmitted event notification destination-registering requests rejected in the above-described processing. In the illustrated example, an IP address 1301a (192.168.242.102) of the PC 102 has been added to the list.

A rejection cancel button 1302 is for canceling a rejected state of the IP address 1301. When the rejection cancel button 1302 is pressed, the storage address deletion section 1105 deletes IP address information (192.168.242.102) stored in the IP address-storing section 1103 in response to a command for deleting the corresponding IP address. After deletion of the corresponding IP address, it is possible to receive an event notification destination-registering request again. Although not shown, an IP address rejection of which is canceled once by the user may be stored such that a registration request from the IP address is always accepted.

According to the above-described fourth embodiment, when an event notification destination-registering request for requesting registration of a query string-containing URL is received, information on the PC 102 having transmitted the event notification destination-registering request is stored such that the MFP 101b can always reject event notification destination-registering requests made thereafter from the PC 102. This makes it possible to save time and labor required for analysis of the URL of an event notification destination. Further, by providing a user interface that is capable of canceling settings for rejection of registration, configured as above, it is also possible to cancel the settings automatically configured for rejecting event notification destination registration, based on user intention, which prevents user's convenience from being impaired.

Although in the above-described first to fourth embodiments, the description has been given of a case where the present invention is applied to MFPs as data processing apparatuses, this is not limitative, but the present invention can also be applied to a printer, a scanner, a communication apparatus, an information processing apparatus having a communication function, a terminal unit, and so forth.

The above-described embodiments according to the present invention can also be realized by executing software (programs) acquired via a network or various types of storage media using a personal computer (a CPU or a processor).

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-149796, filed Jun. 24, 2009, which is hereby incorporated by reference herein in its entirety.

What is claimed is:

1. A data processing apparatus connected to an information processing apparatus via a network, comprising:
- a notification destination registration unit configured to register a notification destination to which information concerning the data processing apparatus is to be notified, in a storage unit;
- a reception unit configured to receive a registration request for requesting registration of the notification destination in said storage unit, from the information processing apparatus;
- an extraction unit configured to extract destination information for identifying the notification destination from the registration request received by said reception unit;
- an analysis unit configured to analyze the destination information extracted by said extraction unit;
- a character string determination unit configured to determine whether or not the destination information contains a specific character string, based on a result of the analysis by said analysis unit;
- a registration permission decision unit configured to decide whether or not to register the notification destination requested to be registered, according to a result of the determination by said character string determination unit; and
- a response unit configured to send a result of the decision by said registration permission decision unit back to the information processing apparatus,
- wherein, when said character string determination unit determines that the destination information contains the specific character string, said registration permission decision unit is configured to determine that the notification destination is not to be registered in said storage unit, and said response unit is configured to send a response indicating that the notification destination has not been registered, back to the information processing apparatus.

2. The data processing apparatus according to claim 1, further comprising:
- an address storage unit configured to store address information on the information processing apparatus that has made the registration request for requesting registration of the destination information containing the specific character string as a notification destination;
- an address acquisition unit configured to acquire the address information on the information processing apparatus that has made the registration request; and
- an address determination unit configured to determine whether or not the address information stored in said address storage unit contains an address acquired by said address acquisition unit,
- wherein, when said address determination unit determines that the address information on the information processing apparatus has already been stored, said registration permission decision unit is configured to decide that the notification destination is not to be registered in said storage unit without continuing subsequent processing.

3. The data processing apparatus according to claim 2, further comprising:
- a display unit configured to display a list of the address information stored in said address storage unit;
- an operation unit configured to accept an instruction for deleting address information displayed on said display unit; and
- a deletion unit configured to delete the address information instructed to be deleted via said operation unit, from said address storage unit.

4. The data processing apparatus according to claim 1, wherein said reception unit and said response unit configured to process HTTP, and the destination information is a URL.

5. The data processing apparatus according to claim 4, wherein the specific character string is a query string contained in the URL.

6. A data processing apparatus connected to an information processing apparatus via a network, comprising:
- a notification destination registration unit configured to register a notification destination to which information concerning the data processing apparatus is to be notified, in a storage unit;
- a reception unit configured to receive a registration request for requesting registration of the notification destination in said storage unit, from the information processing apparatus;
- an extraction unit configured to extract destination information for identifying the notification destination from the registration request received by said reception unit;
- an analysis unit configured to analyze the destination information extracted by said extraction unit;
- a character string determination unit configured to determine whether or not the destination information contains a specific character string, based on a result of the analysis by said analysis unit;
- a registration permission decision unit configured to decide whether or not to register the notification destination requested to be registered, according to a result of the determination by said character string determination unit; and
- a response unit configured to send a response back to the information processing apparatus,
- wherein, when said character string determination unit determines that the destination information contains the specific character string, said registration permission decision unit is configured to decide that the notification destination is not to be registered in said storage unit, and said response unit is configured to send a response indicating that the notification destination has been normally registered, back to the information processing apparatus.

7. The data processing apparatus according to claim 6, wherein said reception unit and said response unit are configured to process HTTP, and the destination information is a URL.

8. The data processing apparatus according to claim 7, wherein the specific character string is a query string contained in the URL.

9. A data processing apparatus connected to an information processing apparatus via a network, comprising:
- a notification destination registration unit configured to register a notification destination to which information concerning the data processing apparatus is to be notified, in a storage unit;
- a reception unit configured to receive a registration request for requesting registration of the notification destination in said storage unit, from the information processing apparatus;
- an extraction unit configured to extract destination information for identifying the notification destination from the registration request received by said reception unit;
- an analysis unit configured to analyze the destination information extracted by said extraction unit;
- a character string determination unit configured to determine whether or not the destination information contains a specific character string, based on a result of the analysis by said analysis unit;
- a notification destination determination unit configured to generate new destination information by deleting the specific character string from the destination information, according to a result of the determination by said character string determination unit; and
- a response unit configured to send a response back to the information processing apparatus,
- wherein, when said character string determination unit determines that the destination information contains the specific character string, said notification destination determination unit is configured to generate the new destination information by deleting the specific character string from the destination information, and said response unit is configured to send a response indicating that the notification destination has been normally registered, back to the information processing apparatus.

10. The data processing apparatus according to claim 9, further comprising a communicability determination unit configured to determine whether or not it is possible to communicate with a destination indicated by the new destination information generated by said notification destination determination unit, and
- wherein said communicability determination unit is configured to transmit a message to the destination indicated by the new destination information so as to determine whether or not it is possible to communicate therewith, and if said communicability determination unit determines that it is not possible to communicate therewith, said notification destination registration unit is configured to not register the new destination information but said response unit is configured to send a response indicating that the destination information has not been registered, to the information processing apparatus.

11. The data processing apparatus according to claim 10, wherein said reception unit and said response unit are configured to process HTTP, and the destination information is a URL.

12. The data processing apparatus according to claim 11, wherein the specific character string is a query string contained in the URL.

13. A data processing method for a data processing apparatus connected to an information processing apparatus via a network, comprising:
- registering a notification destination to which information concerning the data processing apparatus is to be notified, in a storage unit;
- receiving a registration request for requesting registration of the notification destination in the storage unit, from the information processing apparatus;
- extracting destination information for identifying the notification destination from the received registration request;
- analyzing the extracted destination information;
- determining whether or not the destination information contains a specific character string, based on a result of the analysis;
- deciding whether or not to register the notification destination requested to be registered, according to a result of the determination; and
- sending a result of the decision back to the information processing apparatus,
- wherein, when said determining determines that the destination information contains the specific character string, said decision decides that the notification destination is not to be registered in the storage unit, and said sending sends a response indicating that the notification destination has not been registered, back to the information processing apparatus.

14. A data processing method for a data processing apparatus connected to an information processing apparatus via a network, comprising:
- registering a notification destination to which information concerning the data processing apparatus is to be notified, in a storage unit;
- receiving a registration request for requesting registration of the notification destination in the storage unit, from the information processing apparatus;
- extracting destination information for identifying the notification destination from the received registration request;
- analyzing the extracted destination information;
- determining whether or not the destination information contains a specific character string, based on a result of the analysis;
- deciding whether or not to register the notification destination requested to be registered, according to a result of the determination; and
- sending a response back to the information processing apparatus,
- wherein, when said determining determines that the destination information contains a specific character string, said decision decides that the notification destination is not to be registered in the storage unit, and said sending sends a response indicating that the notification destination has been normally registered, back to the information processing apparatus.

15. A data processing method for a data processing apparatus connected to an information processing apparatus via a network, comprising:
- registering a notification destination to which information concerning the data processing apparatus is to be notified, in a storage unit;
- receiving a registration request for requesting registration of the notification destination in the storage unit, from the information processing apparatus;
- extracting destination information for identifying the notification destination from the received registration request;
- analyzing the extracted destination information;
- determining whether or not the destination information contains a specific character string, based on a result of the analysis;

generating new destination information by deleting the specific character string from the destination information, according to a result of the determination;
deciding whether or not to register the notification destination requested to be registered, according to a result of the determination; and
sending a response back to the information processing apparatus,
wherein, when said determining determines that the destination information contains the specific character string, said generating generates the new destination information by deleting the specific character string from the destination information, and said sending sends a response indicating that the notification destination has been normally registered, back to the information processing apparatus.

16. A non-transitory computer-readable storage medium storing a computer-executable program configured to cause at least a computer to execute a data processing method for a data processing apparatus connected to an information processing apparatus via a network, the program comprising:
registering instructions configured to register a notification destination to which information concerning the data processing apparatus is to be notified, in a storage unit;
receiving instructions configured to receive a registration request for requesting registration of the notification destination in the storage unit, from the information processing apparatus;
extracting instructions configured to extract destination information for identifying the notification destination from the received registration request;
analyzing instructions configured to analyze the extracted destination information;
determining instructions configured to determine whether or not the destination information contains a specific character string, based on a result of the analysis;
deciding instructions configured to decide whether or not to register the notification destination requested to be registered, according to a result of the determination; and
sending instructions configured to send a result of the decision back to the information processing apparatus,
wherein, when said determination according to the determining instructions determines that the destination information contains the specific character string, said decision instructions are configured to decide that the notification destination is not to be registered in the storage unit, and said sending instructions are configured to send a response indicating that the notification destination has not been registered, back to the information processing apparatus.

17. A non-transitory computer-readable storage medium storing a computer-executable program configured to cause at least a computer to execute a data processing method for a data processing apparatus connected to an information processing apparatus via a network, the program comprising:
registering instructions configured to register a notification destination to which information concerning the data processing apparatus is to be notified, in a storage unit;
receiving instructions configured to receive a registration request for requesting registration of the notification destination in the storage unit, from the information processing apparatus;
extracting instructions configured to extract destination information for identifying the notification destination from the received registration request;
analyzing instructions configured to analyze the extracted destination information;
determining instructions configured to determine whether or not the destination information contains a specific character string, based on a result of the analysis;
deciding instructions configured to decide whether or not to register the notification destination requested to be registered, according to a result of the determination; and
sending instructions configured to send a response back to the information processing apparatus,
wherein, when said determination according to the determining instructions determines that the destination information contains a specific character string, said decision instructions are configured to decide that the notification destination is not to be registered in the storage unit, and said sending instructions are configured to send a response indicating that the notification destination has been normally registered, back to the information processing apparatus.

18. A non-transitory computer-readable storage medium storing a computer-executable program configured to cause at least a computer to execute a data processing method for a data processing apparatus connected to an information processing apparatus via a network, the program comprising:
registering instructions configured to register a notification destination to which information concerning the data processing apparatus is to be notified, in a storage unit;
receiving instructions configured to receive a registration request for requesting registration of the notification destination in the storage unit, from the information processing apparatus;
extracting instructions configured to extract destination information for identifying the notification destination from the received registration request;
analyzing instructions configured to analyze the extracted destination information;
determining instructions configured to determine whether or not the destination information contains a specific character string, based on a result of the analysis;
generating instructions configured to generate new destination information by deleting the specific character string from the destination information, according to a result of the determination; and
sending instructions configured to send a response back to the information processing apparatus,
wherein, when said determination according to the determining instructions determines that the destination information contains the specific character string, said generating instructions are configured to generate the new destination information by deleting the specific character string from the destination information, and said sending instructions are configured to send a response indicating that the notification destination has been normally registered, back to the information processing apparatus.

19. A data processing apparatus connected to an information processing apparatus via a network, comprising:
a registration unit configured to register a notification destination to which information concerning the data processing apparatus is to be notified;
a reception unit configured to receive a registration request for requesting registration of the notification destination in said registration unit, from the information processing apparatus;

a first determination unit configured to determine whether or not a destination information indicated by the registration request contains a specific character string; and a second determination unit configured to determine whether or not to register the destination information indicated by the registration request in said registration unit, according to a result of the determination by said first determination unit, wherein, when said first determination unit determines that the destination information contains the specific character string, said second determination unit is configured to determine that the notification destination is not registered in said registration unit.

20. The data processing apparatus according to claim 19, wherein, when said first determination unit determines that the destination information does not contain the specific character string, said second determination unit is configured to determine that the notification destination is registered in said registration unit.

21. The data processing apparatus according to claim 19, further comprising:

a response unit configured to send a response to the information processing apparatus, wherein, when said first determination unit determines that the destination information contains the specific character string, said second determination unit is configured to determine that the notification destination is not registered in said registration unit, and said response unit is configured to send the response indicating that the notification destination is not registered in said registration unit.

22. The data processing apparatus according to claim 19, further comprising:

a response unit configured to send a response to the information processing apparatus, wherein, when said first determination unit determines that the destination information contains the specific character string, said second determination unit is configured to determine that the notification destination is not registered in said registration unit, and said response unit is configured to send the response indicating that the notification destination has been normally registered in said registration unit.

23. The data processing apparatus according to claim 21, wherein the destination information indicated by the registration request is a URL.

24. The data processing apparatus according to claim 23, wherein the specific character string is a query string contained in the URL.

25. A data processing method for a data processing apparatus connected to an information processing apparatus via a network, comprising:

registering a notification destination to which information concerning the data processing apparatus is to be notified;

receiving a registration request for requesting registration of the notification destination by said registering, from the information processing apparatus;

determining whether or not a destination information indicated by the registration request contains a specific character string; and determining whether or not to register, by said registering, the destination information indicated by the registration request, according to a result of the determination of whether or not the destination information indicated by the registration request contains the specific character string, wherein, when it is determined that the destination information contains the specific character string, it is determined that the notification destination is not registered by said registering.

26. A non-transitory computer-readable storage medium storing a computer-executable program configured to cause at least computer to execute a data processing method for a data processing apparatus connected to an information processing apparatus via a network, the program comprising:

registration instructions configured to register a notification destination to which information concerning the data processing apparatus is to be notified;

reception instructions configured to receive a registration request for requesting registration of the notification destination according to said registration instructions, from the information processing apparatus;

first determination instructions configured to determine whether or not a destination information indicated by the registration request contains a specific character string; and second determination instructions configured to determine whether or not to register the destination information indicated by the registration request according to said registration instructions, according to a result of the determination according to said first determination instructions, wherein, when it is determined according to said first determination instructions that the destination information contains the specific character string, said second determination instructions are configured to determine that the notification destination is not registered according to said registration instructions.

\* \* \* \* \*